(12) United States Patent
Matsuda (10) Patent No.: US 7,280,751 B2
(45) Date of Patent: Oct. 9, 2007

(54) IN-FINDER DISPLAY DEVICE

(75) Inventor: Takaho Matsuda, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 357 days.

(21) Appl. No.: 11/109,328

(22) Filed: Apr. 19, 2005

(65) Prior Publication Data

US 2005/0238344 A1    Oct. 27, 2005

(30) Foreign Application Priority Data

Apr. 21, 2004  (JP) ............................. 2004-125384

(51) Int. Cl.
*G03B 13/16* (2006.01)
*G03B 17/20* (2006.01)

(52) U.S. Cl. ...................... 396/147; 396/296

(58) Field of Classification Search ........ 396/121–123, 396/147, 150, 152, 288, 296
See application file for complete search history.

(56) References Cited

U.S. PATENT DOCUMENTS 4,367,463 A * 1/1983 Suzuki et al. ................... 345/9
5,235,380 A * 8/1993 Yamada et al. ............. 396/289
6,714,244 B1 * 3/2004 Takebayashi et al. .. 348/333.02
7,039,310 B2 * 5/2006 Haraguchi et al. .......... 396/147
7,046,295 B2 * 5/2006 Hovanky ..................... 348/373

FOREIGN PATENT DOCUMENTS

JP         8-43913 A      2/1996

* cited by examiner

*Primary Examiner*—W. B. Perkey
(74) *Attorney, Agent, or Firm*—Canon U.S.A. Inc I.P. Div (57) ABSTRACT

An in-finder display device includes an optical member having prisms and disposed about a position where an objective unit forms an image; an image-inverting unit receiving light from the optical member; an eyepiece unit for guiding the light from the image-inverting unit to an observer; a light source; and an illuminating unit for guiding light from the light source to the prisms. Each of the prisms in the optical member has two prism facets forming a ridgeline nonparallel to a plane orthogonal to an optical axis of the objective unit. Light from the light source is reflected off the prisms, passes through the image-inverting unit, and is guided by the eyepiece unit to the observer.

4 Claims, 7 Drawing Sheets

IN-FINDER DISPLAY DEVICE

BACKGROUND OF THE INVENTION

1. Field of the Invention

The present invention relates to an in-finder display device suitable for displaying image-capturing information in a finder of, for example, a single-lens reflex camera.

2. Description of the Related Art

A so-called superimposed display function, in which image-capturing information is superimposed on a subject image in a finder of a single-lens reflex camera, is conventionally known. An example of a display device with such a function is disclosed in Japanese Patent Laid-Open No. 8-43913. In this display device, a plurality of focus-detection points in a finder screen are displayed in superimposed display mode, based on the structure in which a plurality of light-emitting elements correspond to respective reflecting surfaces of a deflecting part.

Figure 9:
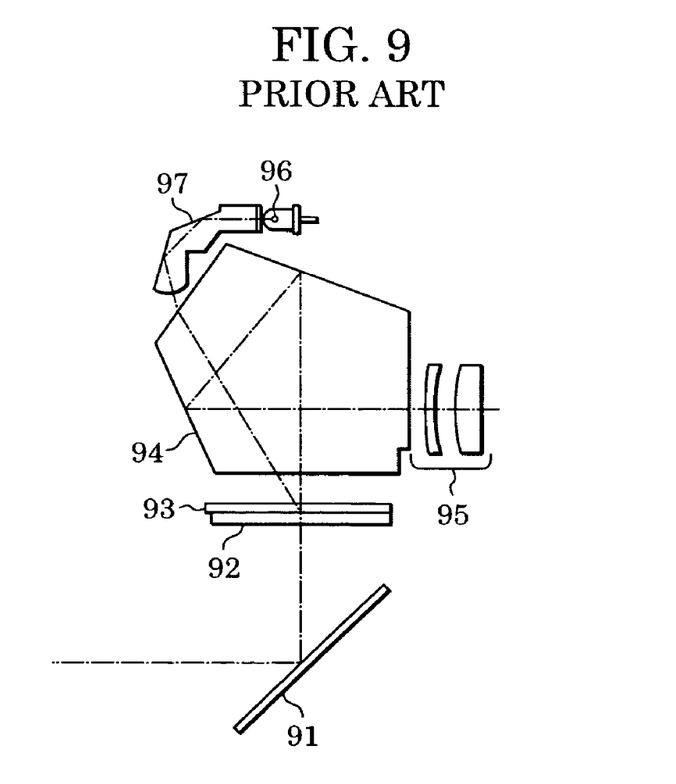
FIG. 9 shows an example of a known in-finder display device.

FIG. 9 shows the structure of the in-finder display device disclosed in Japanese Patent Laid-Open No. 8-43913.

Figure 11:
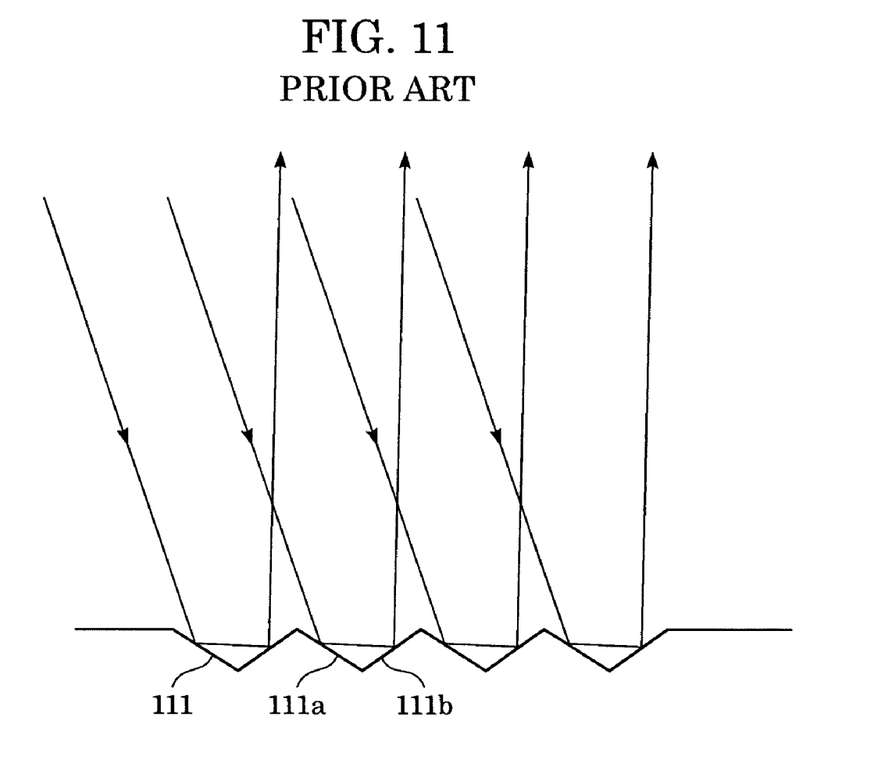
FIG. 11 is an enlarged view of the optical member 93 shown in FIG. 9.

A quick-return mirror 91 guides light from an image-capturing optical system (not shown) to a finder optical system. Light from a subject is reflected off the quick-return mirror 91 and forms an image on a focusing plate 92. The subject image formed on the focusing plate 92 is guided to the photographer's eye through an optical member 93 for superimposed display, a pentaprism 94 for inverting the subject image on the focusing plate 92 to form an erect image, and an eyepiece 95. Light from a light-emitting diode (LED) 96, which is provided for superimposed display, is guided through an illumination optical system 97 and the pentaprism 94 to the optical member 93. The optical member 93 is, as shown in FIG. 11, provided with prisms 111 on a surface adjacent to the focusing plate 92. A prism facet 111a and a prism facet 111b of each prism 111 reflect and allow light to pass through the illumination optical system 97 and the pentaprism 94 to reach the photographer's eye.

Figure 10:
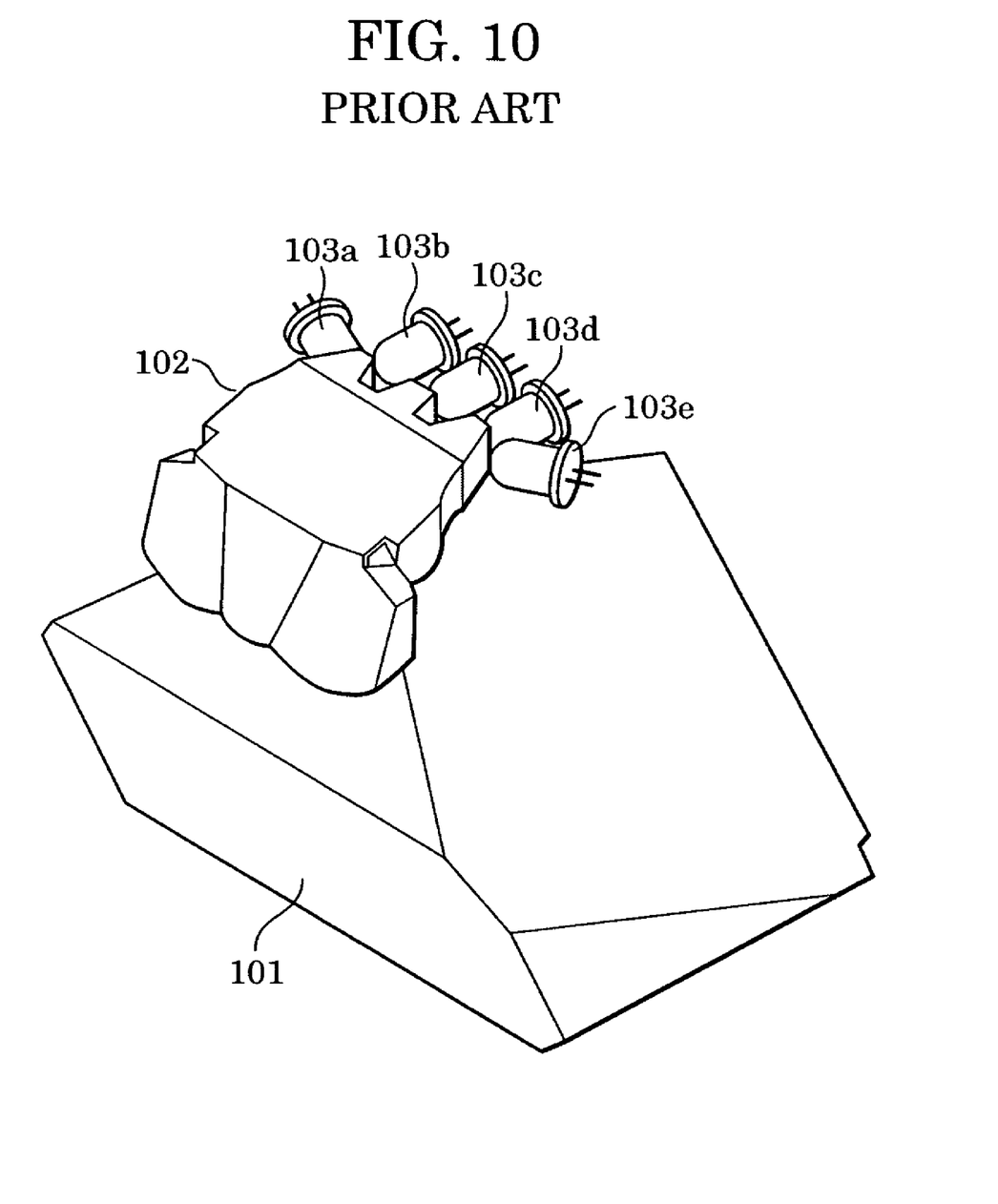
FIG. 10 is a perspective view of the known in-finder display device shown in FIG. 9.
Figure 12:
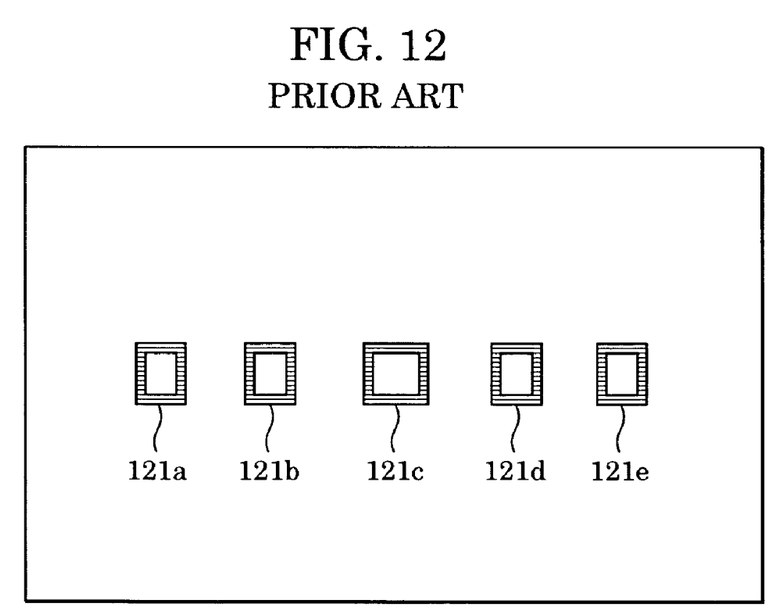
FIG. 12 shows the finder field of view of the known in-finder display device in FIG. 9.

FIG. 10 is a perspective view showing the above-described in-finder display device (FIG. 9) viewed from obliquely above. LEDs 103a to 103e correspond to respective focus-detecting frames 121a to 121e within the finder field of view shown in FIG. 12. The LEDs 103a to 103e are turned on to illuminate the focus-detecting frames 121a to 121e, respectively. An illumination optical system 102 in FIG. 10 corresponds to the illumination optical system 97 in FIG. 9. The illumination optical system 102 has a powered surface (curved surface) facing a pentaprism 101. The powered surface is divided into three areas, that is, an area corresponding to the focus-detecting frames 121a and 121b, an area corresponding to the focus-detecting frame 121c, and an area corresponding to the focus-detecting frames 121d and 121e. The three areas guide light from the LEDs 103a to 103e, along the length of the finder field of view shown in FIG. 12, to the photographer's eye.

According to the structure described above, a plurality of focus-detection points arranged in and around the perimeter of the screen can be displayed in superimposed display mode.

However, the structure disclosed in Japanese Patent Laid-Open No. 8-43913 poses a problem in that an increase in the number of focus-detection points to be displayed in superimposed display mode leads to an increase in the size of the camera and increased costs, because additional illumination optical systems for guiding light from the light source to the photographer's eye, or additional powered surfaces of the illumination optical system are required.

SUMMARY OF THE INVENTION

The present invention is directed to an inexpensive and compact in-finder display device and a camera incorporating the same.

In one aspect of the present invention, an in-finder display device includes an optical member having prisms and disposed about a position where an objective unit forms an image; an image-inverting unit receiving light from the optical member; an eyepiece unit for guiding the light from the image-inverting unit to an observer; a light source; and an illuminating unit for guiding light from the light source to the prisms. Each of the prisms in the optical member has two prism facets defining a ridgeline nonparallel to a plane orthogonal to an optical axis of the objective unit. Light from the light source reflects off the prisms, passes through the image-inverting unit, and is guided by the eyepiece unit to the observer.

In another aspect of the present invention, an in-finder display device includes an optical member having focus-detecting frames and disposed about a position where an objective unit forms an image; an image-inverting unit receiving light from the optical member; an eyepiece unit for guiding the light from the image-inverting unit to an observer; a light source; and an illuminating unit for guiding light from the light source to the focus-detecting frames. Each of the focus-detecting frames includes prisms, each prism having two prism facets defining a ridgeline nonparallel to a plane orthogonal to an optical axis of the objective unit. Light from the light source reflects off the focus-detecting frames, passes through the image-inverting unit, and is guided by the eyepiece unit to the observer.

Further features and advantages of the present invention will become apparent from the following description of exemplary embodiments with reference to the attached drawings.

DESCRIPTION OF THE EMBODIMENTS

Embodiments of the present invention will now be described with reference to the drawings.

First Embodiment

Figure 1:
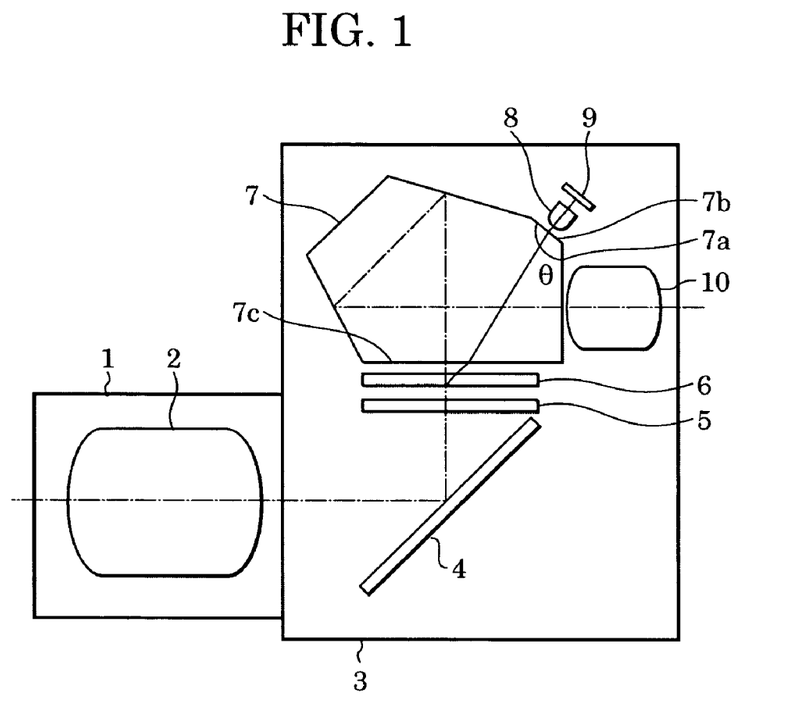
FIG. 1 illustrates a first embodiment of the present invention.

FIG. 1 shows the structure of an optical system of a single-lens reflex camera that includes an in-finder display device of a first embodiment of the present invention.

A lens barrel 1 including an image-capturing optical system (objective unit) 2 is detachable from a camera body 3. Light from a subject passes through the image-capturing optical system 2 and is guided to a finder optical system by a quick-return mirror 4. Although not shown, a silver salt film and a solid-state image sensor (CCD or CMOS sensor) are disposed behind the quick-return mirror 4 (in a straight direction along which the light from the image-capturing optical system 2 travels). The quick-return mirror 4 turns in synchronization with a camera release to switch between an image-capturing optical path and a finder optical path. The light reflected upward from the quick-return mirror 4 forms an image on the upper surface of a focusing plate 5, which provides a Fresnel surface on the bottom.

An optical plate 6 for display in a finder screen is disposed above the focusing plate 5. A pentagonal roof prism 7 for inverting the subject image formed on the focusing plate 5 into an erect image and guiding it to the photographer's (observer's) eye is disposed above the optical plate 6. The pentagonal roof prism 7 has an entrance surface 7c and an exit surface 7a as well as a plurality of reflecting surfaces. In addition, an optical surface 7b for guiding illuminating light to the optical plate 6 for display in the finder screen is disposed above the exit surface 7a of the pentagonal roof prism 7. The optical surface 7b forms an angle θ with the exit surface 7a. The subject image formed on the focusing plate 5 by the image-capturing optical system 2 is inverted to form an erect image by the pentagonal roof prism 7 and guided through an eyepiece 10 to the photographer. The finder optical system including the focusing plate 5, the optical plate 6, the pentagonal roof prism 7, and the eyepiece 10 is configured for the photographer to be able to observe a rectangular field of view corresponding to a film surface and to an imaging area of the solid-state image sensor. In FIG. 1, the horizontal direction corresponds to the shorter side of the observation field of view (vertical direction of the field of view), while the direction orthogonal to the page corresponds to the longer side of the observation field of view (horizontal direction of the field of view).

Figure 2:
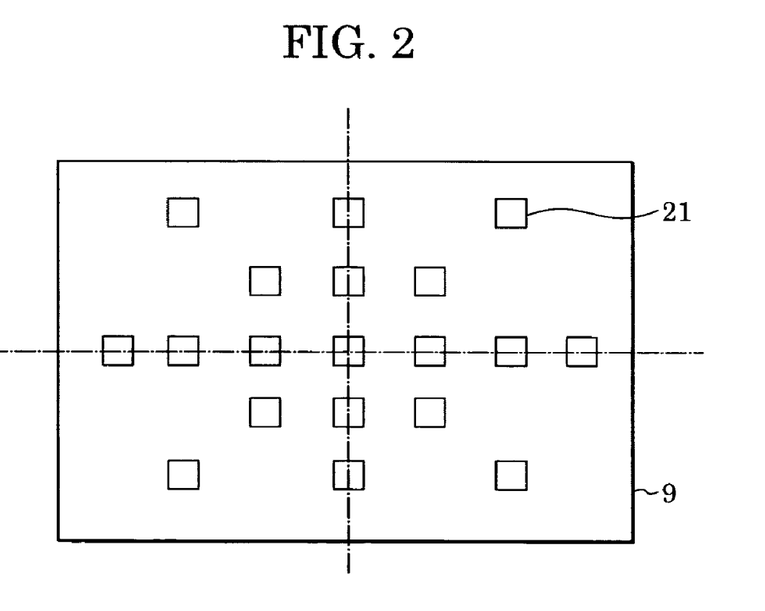
FIG. 2 shows an LED unit for in-finder display.

Furthermore, an illumination optical system 8 and an LED unit 9 are disposed above the optical surface 7b. As show in FIG. 2, a plurality of LED arrays 21 is arranged on the LED unit 9. Each LED array 21 is associated with respective focus-detection points in a focus-detecting device (not shown).

The angle θ between the optical surface 7b and the exit surface 7a satisfies 110 degrees <θ<165 degrees. If the angle θ is below the lower limit of this range, a reflection area in a roof portion of the pentagonal roof prism 7 is reduced to ensure a sufficient range for allowing light from the illumination optical system 8 to pass through. In this case, the subject image or information (for example, a shutter speed for image-capturing) to be displayed below the subject image tends to be left out. On the other hand, if the angle θ is above the upper limit of this range, a sufficient effective area of the optical surface 7b cannot be secured.

Light from the LED unit 9 passes through the illumination optical system 8, the optical surface 7b, and the entrance surface 7c to obliquely illuminate the optical plate 6 in the direction along the shorter side of the observation field of view, in a plane including the optical axis of the image-capturing optical system 2. At the bottom surface of the optical plate 6, the light is reflected from prisms corresponding to focus-detecting frames and guided, along with the subject image, through the pentagonal roof prism 7 and the eyepiece 10 to the photographer's eye.

Figure 3:
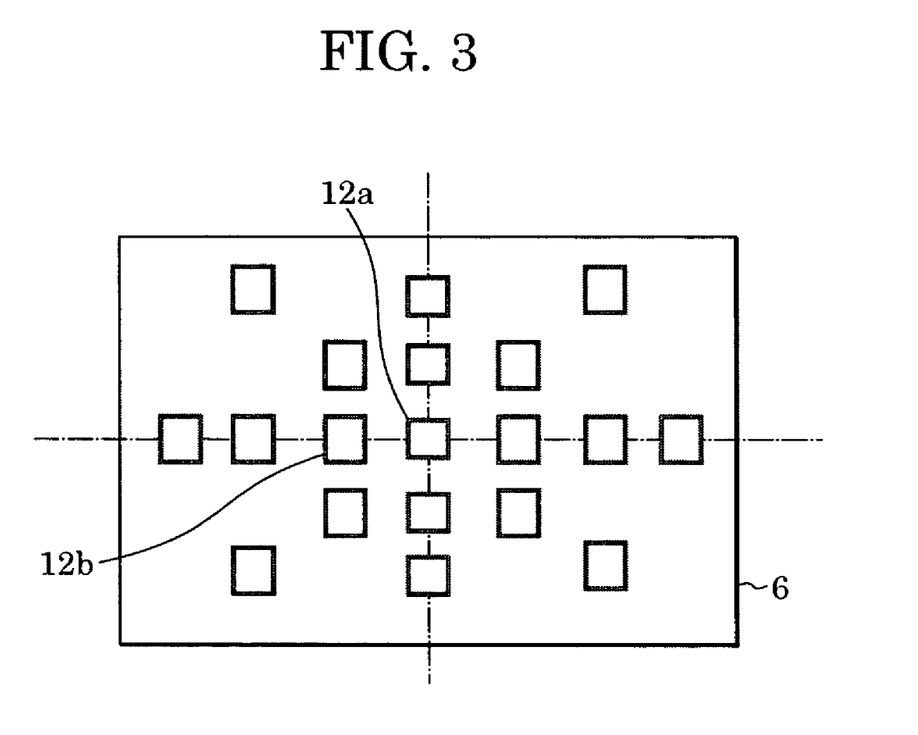
FIG. 3 shows the arrangement of focus-detecting frames on an optical plate of the first embodiment.
Figure 4A:
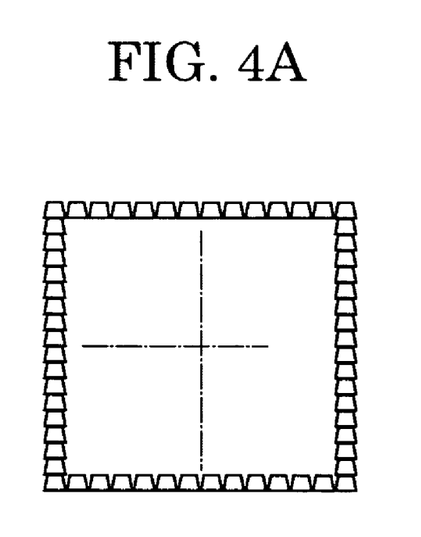
FIGS. 4A and 4B are enlarged views of focus-detecting frames on the optical plate of the first embodiment.
Figure 4B:
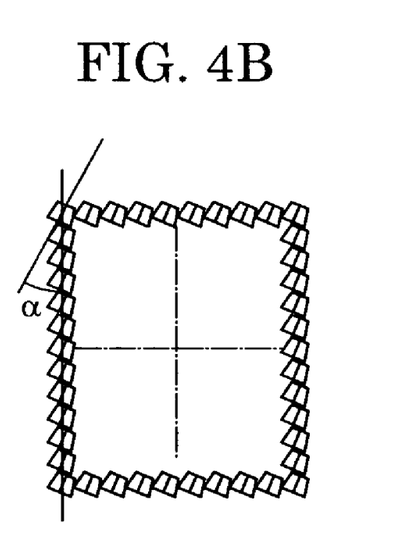
Figure 5:
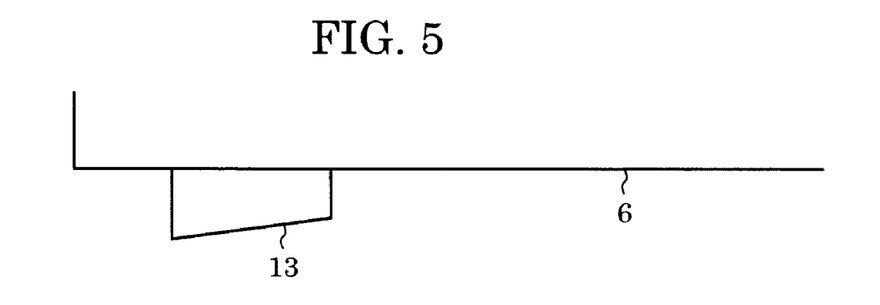
FIG. 5 is a side view showing a prism of a focus-detecting frame.
Figure 13:
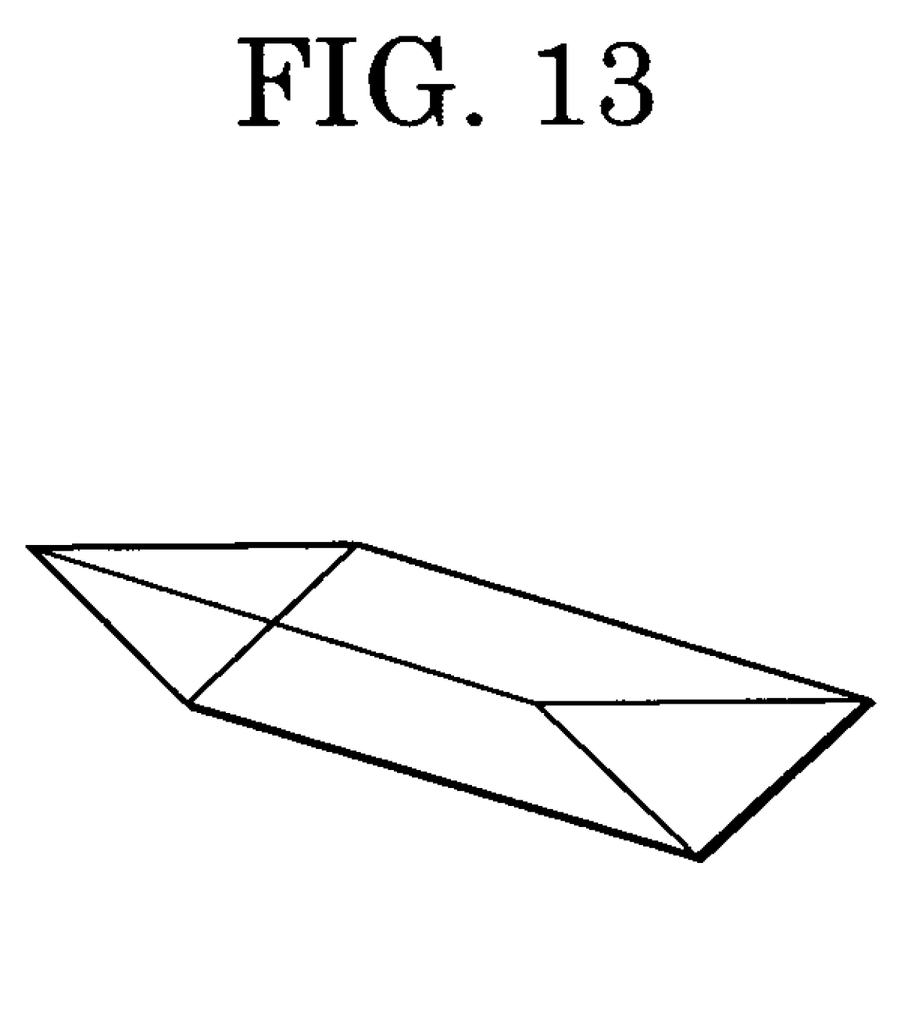
FIG. 13 is a perspective view showing a prism of a focus-detecting frame.

As shown in FIG. 3, the optical plate 6 is provided with focus-detecting frames 12 formed of fine prisms arranged in positions corresponding to the positions of the LED arrays 21 on the LED unit 9. FIG. 4A is an enlarged view of a focus-detecting frame 12a located in the center of the screen (field of view) shown in FIG. 3. FIG. 4B is an enlarged view of one of focus-detecting frames 12b horizontally arranged around the focus-detecting frame 12a on the screen. The prisms of the focus-detecting frames are roof prisms shown in FIG. 13. As shown in FIG. 5, a ridgeline 13 of each prism is tilted when projected onto a cross section along the shorter side of the observation field of view (a plane including the optical axis of the image-capturing optical system 2, the page of FIG. 1), and is not parallel to the plane extending from the optical plate 6 (plane orthogonal to the optical axis).

As described, the ridgeline of each prism of the focus-detecting frame is tilted relative to a plane orthogonal to the optical axis, according to the direction in which illuminating light obliquely enters. This enables reflected light from prisms to reach the photographer without using a complicated illumination optical system such as that conventionally used. Therefore, the illumination optical system 8 for superimposed display may be a single lens as described in the present embodiment. Superimposed display can thus be achieved with a simple structure.

As shown in FIG. 4A, at the focus-detecting frame 12a located in the screen center and focus-detecting frames located directly above and below the focus-detecting frame 12a in the screen center, a ridgeline of each roof prism is parallel to the vertical direction of the finder field of view. On the other hand, as shown in FIG. 4B, at each of the surrounding focus-detecting frames 12b, a ridgeline of each roof prism forms an angle α with respect to the vertical and horizontal directions of the finder field of view. The angle α is determined by the direction of the line of intersection of the optical plate 6 and a plane defined by three points: the center of the exit pupil of the illumination optical system 8, the center of each surrounding focus-detecting frame 12b, and the center of the entrance pupil of the eyepiece 10.

As described above, the ridgeline 13 of each prism of the focus-detecting frame 12 is tilted with respect to the plane extending from the optical plate 6. This enables the illumination optical system 8, even if it is a single lens, to guide light from the LED unit 9 to the photographer's eye. Moreover, since the prisms of the focus-detecting frame 12 are roof prisms, light from the LED unit 9 can be effectively guided to the photographer's eye and thus, a brighter in-finder display can be achieved.

Although the focusing plate 5 and the optical plate 6 are separate in the present embodiment, they may be provided in one unit. That is, the focus-detecting frames formed of the prisms described in the present embodiment may be provided on the focusing plate located in an image-forming position of the image-capturing optical system.

Second Embodiment

A second embodiment of the present invention will now be described.

The camera structure is as shown in FIG. 1 and will not be described here, as it is the same as that of the first embodiment. The only difference between the first embodiment and the second embodiment is the shape of each prism of focus-detecting frames on an optical plate 6.

Figure 6:
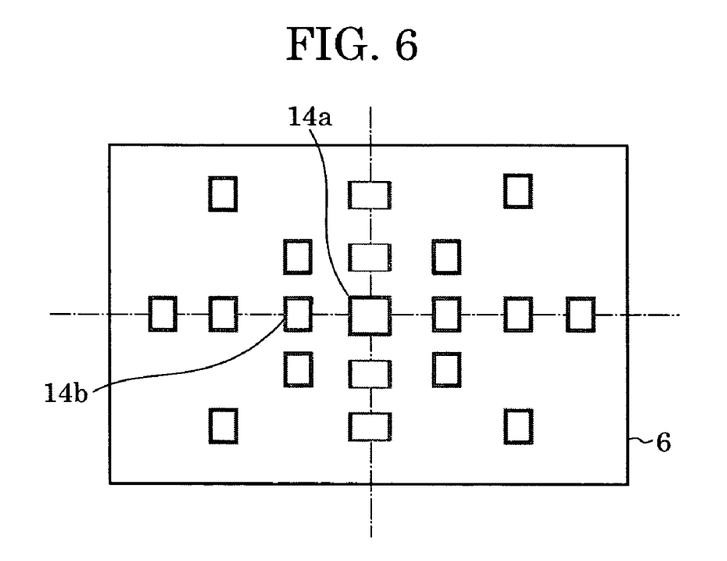
FIG. 6 shows the arrangement of focus-detecting frames on an optical plate of a second embodiment.
Figure 7A:
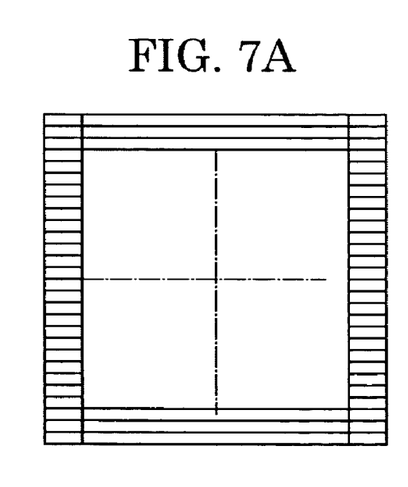
FIGS. 7A and 7B are enlarged views of focus-detecting frames on the optical plate of the second embodiment.
Figure 7B:
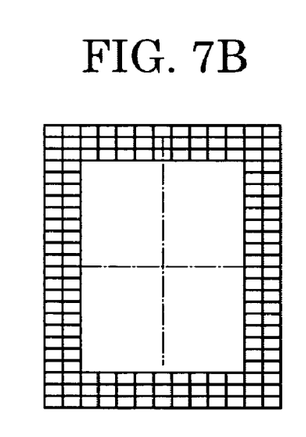

FIG. 6 shows the arrangement of focus-detecting frames on the optical plate 6. Similarly to the first embodiment, each focus-detecting frame is formed of fine prisms. FIG. 7A is an enlarged view of a focus-detecting frame 14a located in the center of the screen (field of view) shown in FIG. 6. FIG. 7B is an enlarged view of focus-detecting frames 14b horizontally arranged around the focus-detecting frame 14a on the screen.

Similarly to the first embodiment, a ridgeline 13 of each prism is not parallel to the plane extending from the optical plate 6, as shown in FIG. 5. The difference from the first embodiment is that two prism facets of each prism, which is not a roof prism, form an angle of about 100 degrees. Compared to the case where roof prisms are used, this reduces by about half the amount of light guided from the illumination optical system 8 to the photographer's eye. However, when roof prisms are used, it is difficult, as shown in FIG. 4B, to form each of the focus-detecting frames around the perimeter of the screen into the shape of a complete rectangle while a ridgeline of each prism is kept non-parallel with the plane extending from the optical plate 6. On the other hand, freed from the constraints of the shape of the roof prism, each of the focus-detecting frames around the perimeter of the screen can be formed into a complete rectangle, as shown in FIG. 7B. Therefore, the second embodiment has an advantage in terms of uniformity in appearance of the focus-detecting frames.

Third Embodiment

A third embodiment of the present invention will now be described.

Figure 8:
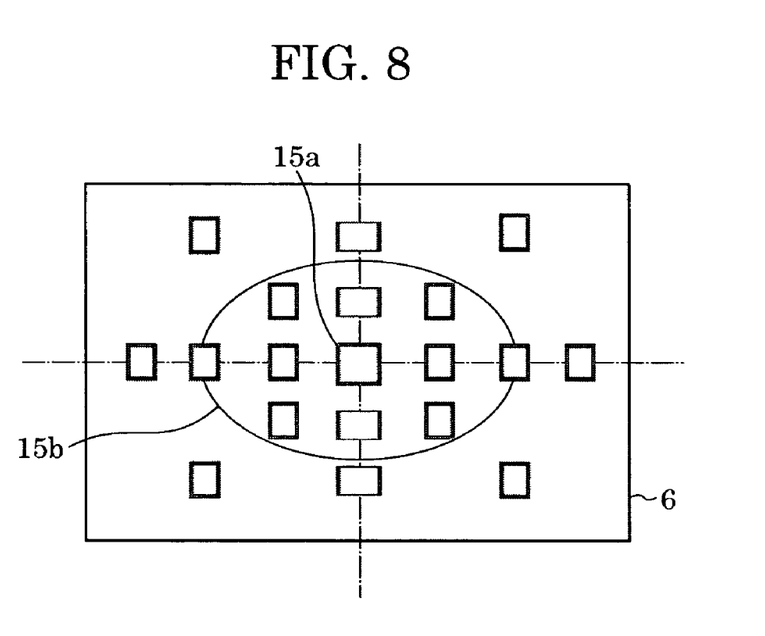
FIG. 8 shows the arrangement of focus-detecting frames and an indicator showing a photometry range on an optical plate of a third embodiment.

The camera structure is as shown in FIG. 1 and will not be described here, as it is the same as those of the first and second embodiments. As shown in FIG. 8, the third embodiment is different from the first and second embodiments in that an indicator 15b showing the photometry range, as well as focus-detecting frames 15a, is provided in an optical plate 6.

The production costs can thus be reduced by arranging the focus-detecting frames and the indicator showing the photometry range on the same component. Moreover, misalignment between the focus-detecting frames and the indicator can be prevented, unlike the case where they are arranged on different components.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-125384 filed Apr. 21, 2004, which is hereby incorporated by reference herein.

What is claimed is:

1. An in-finder display device comprising:
   an optical member including prisms and disposed about a position where an objective unit forms an image, each prism having two prism facets defining a ridgeline nonparallel to a plane orthogonal to an optical axis of the objective unit;
   an image-inverting unit receiving light from the optical member;
   an eyepiece unit guiding the light from the image-inverting unit to an observer;
   a light source; and
   an illuminating unit guiding light from the light source to the prisms,
   wherein the light from the light source reflects off the prisms, passes through the image-inverting unit, and is guided by the eyepiece unit to the observer,
   wherein the image-inverting unit includes a pentagonal roof prism having a roof surface, an exit surface, and an optical surface allowing the light from the illuminating unit to pass through, the optical surface being located between the roof surface and the exit surface, and
   wherein the optical surface and the exit surface define an angle ($\theta$) satisfying 110 degrees <$\theta$<165 degrees.

2. The in-finder display device according to claim 1, wherein the light source and the illuminating unit are disposed so as to obliquely illuminate the prisms in a plane including the optical axis of the objective unit.

3. The in-finder display device according to claim 2, wherein the ridgeline of each prism projected onto the plane including the optical axis of the objective unit is nonparallel to the plane orthogonal to the optical axis of the objective unit.

4. A camera comprising:
   a mirror separating a finder optical path and an image-capturing optical path; and
   the in-finder display device according to claim 1, the in-finder display device being arranged in the finder optical path separated by the mirror.

* * * * *